United States Patent
Shimomura et al.

(10) Patent No.: US 6,855,408 B2
(45) Date of Patent: Feb. 15, 2005

(54) COMPOSITE METAL MATERIAL AND METHOD FOR MANUFACTURING THE SAME, ETCHED METAL MATERIAL AND METHOD FOR MANUFACTURING THE SAME AND ELECTROLYTIC CAPACITOR

(75) Inventors: Masatsugu Shimomura, Sapporo (JP); Masaru Tanaka, Sapporo (JP); Hiroshi Yabu, Sapporo (JP); Masafumi Takebayashi, Sapporo (JP); Ryuji Monden, Chiba (JP); Tamami Koyama, Chiba (JP); Yoshikazu Hosoda, Chiba (JP); Masashi Sakaguchi, Sakai (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/351,500

(22) Filed: Jan. 27, 2003

(65) Prior Publication Data

US 2004/0076795 A1 Apr. 22, 2004

Related U.S. Application Data

(60) Provisional application No. 60/358,372, filed on Feb. 22, 2002.

(30) Foreign Application Priority Data

Jan. 25, 2002 (JP) ........................................ 2002-017468

(51) Int. Cl.$^7$ ................................................. B32B 3/26
(52) U.S. Cl. ................... 428/304.4; 428/312.2; 428/312.8; 428/314.8; 428/315.7; 428/317.9; 428/319.1; 428/457
(58) Field of Search ......................... 428/304.4, 312.2, 428/312.8, 314.8, 315.7, 317.9, 319.1, 457

(56) References Cited

U.S. PATENT DOCUMENTS 5,895,263 A * 4/1999 Carter et al. ................. 438/624
6,565,763 B1 * 5/2003 Asakawa et al. .............. 216/56

FOREIGN PATENT DOCUMENTS

| EP | 0 459 461 | 12/1991 |
| JP | 58-34925 | 7/1983 |
| JP | 61-51818 | 3/1986 |
| JP | 3-122260 | 5/1991 |
| JP | 8-253878 | 10/1996 |
| JP | 2000-251236 | 9/2000 |

OTHER PUBLICATIONS

T. Gokawachi, Toshiba Review, vol. 56, No. 10, pp. 66–67, "Nanomaterial", Oct. 1, 2001 (with Partial English translation).

* cited by examiner

Primary Examiner—Deborah Jones
Assistant Examiner—Ling X. Xu
(74) Attorney, Agent, or Firm—Oblon, Spivak, McClelland, Maier & Neustadt, P.C.

(57) ABSTRACT

A composite metallic material 1 according to the invention is used for, e.g., electrolytic capacitors, and includes a metallic material substrate 10 and a high polymer thin layer 11 having a fine pattern 12 formed on at least one surface of the substrate 10 by self-organization. This high polymer thin film 11 is formed by, for example, drying hydrophobic organic solvent solution of high polymer compound. By subjecting this composite metallic material 1 to etching processing, etching pits are formed uniformly with high density based on the fine pattern.

12 Claims, 3 Drawing Sheets

COMPOSITE METAL MATERIAL AND METHOD FOR MANUFACTURING THE SAME, ETCHED METAL MATERIAL AND METHOD FOR MANUFACTURING THE SAME AND ELECTROLYTIC CAPACITOR

Priority is claimed to Japanese Patent Application No. 2002-17468, filed on Jan. 25, 2002 and U.S. Provisional Patent Application No. 60/358,372, filed on Feb. 22, 2002, the disclosure of which are incorporated by reference in their entireties.

CROSS REFERENCE TO RELATED APPLICATIONS

This application is an application filed under 35 U.S.C. § 111(a) claiming the benefit pursuant to 35 U.S.C. § 119(e)(1) of the filing date of Provisional Application No. 60/358,372 filed on Feb. 22, 2002 pursuant to 35 U.S.C. § 111(b).

BACKGROUND OF THE INVENTION

1. Field of the Invention

The present invention relates to a composite metallic material having a metallic material substrate and a polymer thin film formed on the surface of the substrate, a method for manufacturing the composite metallic material, an etched metallic material obtained by forming etching pits in the composite metallic material, a method for manufacturing the etched metallic material, and an electrolytic capacitor.

In this specification, the wording of "aluminum" is used to mean both aluminum and its alloy.

2. Background Art

In recent years, in view of the demands of miniaturization of electronic devices, high density mounting of printed circuit boards and effective mounting thereof, it has been remarkably developed to manufacture chip-shaped miniaturized electronic parts. In view of this, demands of increasing capacitance of electrolytic capacitor have been increased.

Generally, an aluminum foil to be used for electrolytic capacitors is subjected to etching processing to increase the electric capacitance by increasing the surface expansion ratio. Furthermore, since the surface expansion ratio increases as the number and length of the etching pit to be formed by the etching processing increases, various processing is performed to an aluminum material. For example, such processing includes controlling to (100) crystal orientation, adjusting the composition by adding trace elements such as Cu or Pb into an aluminum material, degreasing washing before final annealing and formation processing of crystalline oxide film during final annealing (see, Japanese Examined Laid-open Patent Publication No. 58-34925, Japanese Unexamined Laid-open Patent Publication No. 3-122260, etc.).

However, simply increasing the number or the length of etching pits has been approaching to a limit for increasing the capacitance. In order to increase the surface expansion ratio of an aluminum foil, it is necessary to generate etching pits uniformly with high density on the etching surface by decreasing partial etching, etching failure and surface melting. However, in the aforementioned methods, it is not enough to generate etching pits uniformly with high-density, and the method do not meet the demand of capacitance which are being further increased.

Accordingly, in currently available aluminum foils, distribution of pitting pits can not be controlled during etching processing, causing joined tunnel-like pits, which in turn loses the surface area to be enlarged. Thus, the current capacitance is merely 50 to 65% to ideal capacitance. For the purpose of increasing capacitance, although various attempts such as adhering foreign substances or mechanically forming defects have been made, no attempt has become successful.

SUMMARY OF THE INVENTION

In view of the aforementioned technical background, the present invention aims to provide a composite metallic material capable of: generating etching pits uniformly with high density; etching deeply on the basis of the etching pits without hardly causing joining of tunnel-like pits; and increasing the expansion ratio assuredly to thereby increase capacitance. The present inventin also aims to provide a method for manufacturing the composite metallic material, an etched metallic material and a method for manufacturing the etched metallic material.

In order to attain the aforementioned objects, the first composite metallic material according to the present invention has the following structure.

(1) A composite metallic material comprising a metallic material substrate and a high polymer thin layer having a fine pattern formed on at least one surface of the substrate by self-organization.

(2) The composite metallic material as recited in the above Item 1, wherein the high polymer thin film is a film formed by drying hydrophobic organic solvent solution of a high polymer compound.

(3) The composite metallic material as recited in the above Item 1, wherein the fine pattern is a fine pore structure with a number of arranged pores.

(4) The composite metallic material as recited in the above Item 2, wherein the fine pattern is a fine pore structure with a number of arranged pores.

(5) The composite metallic material as recited in the above the above Item 3 or 4, wherein the pore has a diameter of 0.01 to 50 μm.

(6) The composite metallic material as recited in any one of the above Items 3 to 5, wherein the pores are formed at intervals of 1 to 50 μm.

(7) The composite metallic material as recited in the above Item 3, wherein a substance having conducting property higher than that of oxides of the metallic material substrate is filled in the pores.

(8) The composite metallic material as recited in the above Item 4, wherein a substance having conducting property higher than that of oxides of the metallic material substrate is filled in the pores.

(9) The composite metallic material as recited in any one of the above Items 1, 2, 3, 4, 7 and 8, wherein the metallic material substrate is made of valve-action metal.

(10) The composite metallic material as recited in the above Item 9, wherein the valve-action metal is aluminum.

(11) The composite metallic material as recited in the above Item 10, wherein the composite metallic material is an aluminum material for electrolytic capacitor electrodes.

Furthermore, the second composite metallic material according to the present invention has the following structure.

(12) A composite metallic material, comprising:
a metallic material substrate; and
a number of fine spots of material having conducting property higher than that of oxides of the metallic material substrate, the fine spots being arranged on at least one surface of the metallic material substrate.

(13) The composite metallic material as recited in the above Item 12, wherein the fine spot has a diameter of 0.01 to 50 μm.

(14) The composite metallic material as recited in the above Item 12 or 13, wherein the fine spots are formed at intervals of 1 to 50 μm.

(15) The composite metallic material as recited in the above Item 12, wherein the metallic material substrate is made of valve-action metal.

(16) The composite metallic material as recited in the above Item 15, wherein the valve-action metal is aluminum.

(17) The composite metallic material as recited in the above Item 16, wherein the composite metallic material is an aluminum material for electrolytic capacitor electrodes.

The first method for manufacturing the composite metallic material according to the present invention is a preferable method for manufacturing the first composite metallic material of the present invention, and has the following structure.

(18) A method for manufacturing a composite metallic material comprising a metallic material substrate and a high polymer thin layer having a fine pattern formed on at least one surface of the substrate by self-organization, wherein the high polymer thin film is formed by drying hydrophobic organic solvent solution of a high polymer compound.

(19) The method for manufacturing the composite metallic material as recited in the above Item 18, comprising:

casting hydrophobic organic solvent solution of a high polymer compound on a surface of the metallic material substrate;

evaporating the organic solvent to make dew on a surface of the solution; and evaporating minute water drops generated by the dew to thereby form a high polymer thin film having a number of arranged pores.

(20) The method for manufacturing the composite metallic material as recited in the above Item 18, comprising:

casting hydrophobic organic solvent solution of a high polymer compound on a surface of another substrate other than the metallic material substrate;

evaporating the organic solvent to make dew on a surface of the solution;

evaporating minute water drops generated by the dew to thereby form a high polymer thin film having a number of arranged pores;

removing the high polymer thin film from the another substrate; and attaching the removed high polymer thin film on a surface of the metallic material substrate.

(21) The method for manufacturing the composite metallic material as recited in the above Item 19, further comprising the step of filling a substance having conducting property higher than that of oxides of the metallic material substrate in the pores.

(22) The method for manufacturing the composite metallic material as recited in the above Item 20, further comprising the step of filling a substance having conducting property higher than that of oxides of the metallic material substrate in the pores.

(23) The method for manufacturing the composite metallic material as recited in the above Item 21 or 22, wherein the step of filling the substance having conducting property higher than that of oxides of the metallic material substrate is performed by any one of methods consisting of a plating method, a depositing method and an immersing method.

(24) The method for manufacturing the composite metallic material as recited in any one of the above Items 18 to 22, wherein the high polymer compound is amphiphilic high polymer compound.

(25) The method for manufacturing the composite metallic material as recited in the above Item 24, wherein the amphiphilic high polymer compound is ion complex of polystyrene sulfonic acid and long chain dialkyl ammonium salt.

(26) The method for manufacturing the composite metallic material as recited in any one of the above Items 18 to 22, wherein the density of the hydrophobic organic solvent solution of high polymer compound is 0.01 to 10 mass %.

(27) The method for manufacturing the composite metallic material as recited in any one of the above Items 18 to 22, wherein the forming of the high polymer compound is performed in an atmosphere of high temperature and high humidity.

The second method for manufacturing a composite metallic material according to the present invention is a preferable method for manufacturing the second composite metallic material of the present invention, and has the following structure.

(28) A method for manufacturing a composite metallic material comprising a metallic material substrate and a number of fine spots made of material having conducting property higher than that of oxides of the metallic material substrate, the fine spots being arranged on at least one surface of the metallic material substrate, the method, comprising:

disposing a high polymer thin film having a number of arranged pores on a surface of the metallic material substrate;

filling a substance having conducting property higher than that of oxides of the metallic material substrate in the pores; and thereafter;

removing the high polymer thin film.

(29) The method for manufacturing a composite metallic material as recited in the above Item 28, comprising:

casting hydrophobic organic solvent solution of high polymer compound on a surface of the metallic material substrate, evaporating the organic solvent to make dew on a surface of the solution; and evaporating minute water drops generated by the dew to thereby form a high polymer thin film and dispose the high polymer thin film on the metallic material substrate.

(30) The method for manufacturing a composite metallic material as recited in the above Item 28, comprising:

casting hydrophobic organic solvent solution of high polymer compound on a surface of another substrate other than the metallic material substrate;

evaporating the organic solvent to make dew on a surface of the solution;

evaporating minute water drops generated by the dew to thereby form a high polymer thin film having a number of arranged pores;

removing the high polymer thin film from the another substrate; and attaching the removed high polymer thin film on a surface of the metallic material substrate to dispose it thereon.

(31) The method for manufacturing the composite metallic material as recited in any one of the above Items 28 to 30, wherein the step of filling the substance having conducting property higher than that of oxides of the metallic material substrate is performed by any one of methods consisting of a plating method, a depositing method and an immersing method.

(32) The method for manufacturing the composite metallic material as recited in any one of the above Items 28 to 30, wherein the high polymer compound is an amphiphilic high polymer compound.

(33) The method for manufacturing the composite metallic material as recited in the above Item 32, wherein the amphiphilic property high polymer compound is ion complex of polystyrene sulfonic acid and long chain dialkyl ammonium salt.

(34) The method for manufacturing the composite metallic material as recited in any one of the above Items 28 to 30, wherein the density of the hydrophobic organic solvent solution of high polymer compound is 0.01 to 10 mass %.

(35) The method for manufacturing the composite metallic material as recited in any one of the above Items 28 to 30, wherein the forming of the high polymer compound is performed in an atmosphere of high temperature and high humidity.

(36) The method for manufacturing the composite metallic material as recited in any one of the above Items 28 to 30, wherein the removing of the high polymer thin film is performed by melting.

The first etched metallic material according to the present invention is an etched first composite metallic material of the present invention, and has the following structure.

(37) A metallic material having etching pits formed in a composite metallic material, wherein the composite metallic material includes a metallic material substrate and a high polymer thin layer having a fine pattern formed on at least one surface of the substrate by self-organization, and wherein the etching pits are formed based on the fine pattern.

(38) The metallic material as recited in the above Item 37, wherein the etched metallic material is an aluminum material for electrolytic capacitor electrodes.

The second etched metallic material according to the present invention is an etched second composite metallic material of the present invention, and has the following structure.

(39) A metallic material having etching pits, wherein a composite metallic material comprising a metallic material substrate and a number of fine spots made of material having conducting property higher than that of oxides of the metallic material substrate and arranged on at least one surface of the metallic material substrate is subjected to etching processing, whereby the etching pits are formed based on the fine spots.

(40) The metallic material as recited in the above Item 39, wherein the etched metallic material is an aluminum material for electrolytic capacitor electrodes.

The first method for manufacturing the etched metallic material according to the present invention is a preferable method for manufacturing the first etched metallic material of the present invention, and has the following structure.

(41) A method for manufacturing an etched metallic material having etching pits, wherein the etching pits are formed by subjecting a composite metallic material comprising a metallic material substrate and a high polymer thin layer having a fine pattern formed on at least one surface of the substrate by self-organization to etching processing without removing the high polymer thin film.

(42) A method for manufacturing an etched metallic material having etching pits, wherein the etching pits are formed by subjecting a composite metallic material comprising a metallic material substrate and a high polymer thin layer having a fine pattern formed on at least one surface of the substrate by self-organization to initial etching processing without removing the high polymer thin film, thereafter removing the high polymer thin film and further subjecting the composite metallic material to etching processing to grow the etching pits.

(43) The method for manufacturing the etched metallic material as recited in the above Item 41, wherein the etched metallic material is an aluminum material for electrolytic capacitor electrodes.

(44) The method for manufacturing the etched metallic material as recited in the above Item 42, wherein the etched metallic material is an aluminum material for electrolytic capacitor electrodes.

The second method for manufacturing an etched metallic material according to the present invention is a preferable method for manufacturing the second etched metallic material of the present invention, and has the following structure.

(45) A method for manufacturing an etched metallic material having etching pits, wherein the etching pits are formed by subjecting a composite metallic material comprising a metallic material substrate and a number of fine spots made of material having conducting property higher than that of oxides of the metallic material substrate and arranged on at least one surface of the metallic material substrate to etching processing.

(46) The method for manufacturing the etched metallic material as recited in the above Item 45, wherein the etched metallic material is an aluminum material for electrolytic capacitor electrodes.

The electrolytic capacitor according to the present invention uses the first or second etched metallic material of the present invention as electrode material, and has the following structure.

(47) An electrolytic capacitor made of an etched metallic material having etching pits as an electrode material, wherein a composite metallic material comprising a metallic material substrate and a high polymer thin layer having a fine pattern formed on at least one surface of the substrate by self-organization is subjected to etching processing, whereby the etching pits are formed based on the fine pattern.

(48) An electrolytic capacitor made of an etched metallic material having etching pits as an electrode material, wherein a composite metallic material comprising a metallic material substrate and a number of fine spots made of material having conducting property higher than that of oxides of the metallic material substrate and arranged on at least one surface of the metallic material substrate is subjected to etching processing, whereby the etching pits are formed based on the fine spots.

According to the first composite metallic material of the present invention, etching pits with high density can be formed in an uniformly distributed manner based on the fine pattern by subjecting the material to etching processing, resulting in an enlarged surface area.

In cases where the fine pattern is a fine pore structure with a number of arranged pores, etching pits uniformly distributed with high density can be formed. In cases where the pore has a diameter of 0.01 to 50 μm or the pores are formed at intervals of 1 to 50 μm, extremely high expansion ratio can be obtained.

Furthermore, in cases where a substance having conducting property higher than that of oxides of the metallic material substrate is filled in the pores, the substance having higher conductive property can be a generation core of the etching pit, causing etching pits uniformly distributed with high density.

In cases where the metallic material substrate is made of valve-action metal, the composite metallic material can be used as an electrode material for electrolytic capacitors. For example, the valve-action material can be aluminum, which can be used as an aluminum material for electrolytic capacitors.

According to the second composite metallic material of the invention, since the fine spots made of material having conducting property higher than that of oxides of the metallic material substrate become etching pits generation cores when the composite metallic material is subjected to etching processing, etching pits uniformly distributed with high density can be formed, resulting in an enlarged surface area.

In cases where the fine spot has a diameter of 0.01 to 50 μm or the fine spots are formed at intervals of 1 to 50 μm, higher expansion ratio can be obtained.

In cases the metallic material substrate is made of valve-action metal, it can be used for an electrode material for electrolytic capacitor electrodes. For example, the valve-action material can be aluminum, and can be used as an aluminum material for electrolytic capacitor electrodes.

According to the first method for manufacturing the composite metallic material, the aforementioned first composite metallic material can be preferably manufactured.

In cases where the hydrophobic organic solvent solution of high polymer compound is directly cast on a surface of the metallic material substrate and the organic solvent is dried, a high polymer thin film with a number of arranged pores can be formed on the metallic material substrate in a closely adhered manner, and therefore the forming of the high polymer thin film and the lamination of the film on the metallic material substrate can be performed simultaneously. Furthermore, the composite metallic material can also be manufactured by attaching a high polymer thin film formed on another substrate other than the metallic material substrate on a surface of a certain metallic foil substrate.

Furthermore, by filling a substance having conducting property higher than that of oxides of the metallic material substrate in the pores, etching pits generation cores can be formed. This filling of the high conductive substance can be easily performed by any one of methods including a plating method, a depositing method and an immersing method.

Furthermore, in cases where the high polymer compound is an amphiphilic property high polymer compound such as an ion complex of polystyrene sulfonic acid and long chain dialkyl ammonium salt, a high polymer thin film having a fine pore structure can be formed.

In cases where the density of the hydrophobic organic solvent solution of high polymer compound is 0.01 to 10 mass %, a fine pore structure having a stable fine pore pattern with a certain strength can be formed.

Furthermore, by performing the forming of the high polymer compound in an atmosphere of high temperature and high humidity, a fine pattern and a fine pore structure can be formed assuredly.

According to the second method for manufacturing the composite metallic material of the present invention, the aforementioned second composite metallic material can be preferably manufactured.

In cases where hydrophobic organic solvent solution of high polymer compound is directly cast on a surface of the metallic material substrate and dried, a high polymer thin film having a number of arranged pores can be formed on the metallic material substrate in a closely adhered manner, and therefore the forming of the high polymer thin film and the lamination of the film on the metallic material substrate can be performed simultaneously. Furthermore, the composite metallic material can also be manufactured by attaching a high polymer thin film formed on a substrate other than the metallic material substrate on a surface of a certain metallic foil substrate.

Furthermore, the filling of the substance having conducting property higher than that of oxides of the metallic material substrate into the pores can be easily performed by any one of methods including a plating method, a depositing method and a immersing method.

In cases where the high polymer compound is an amphiphilic high polymer compound such as ion complex of polystyrene sulfonic acid and long chain dialkyl ammonium salt, a high polymer thin film having a pore structure can be formed.

Furthermore, in cases where the density of the hydrophobic organic solvent solution of a high polymer compound is 0.01 to 10 mass %, a fine pattern and a fine pore structure having a stable configuration with certain strength can be formed.

Furthermore, by performing the forming of the high polymer compound in an atmosphere of high temperature and high humidity, a fine pattern and a fine pore structure can be formed assuredly.

Furthermore, the high polymer thin film after the filling of the high conductive material can be easily removed by melting, which enables the forming of fine spots made of a high conductive material based on the fine pattern on the surface of the metallic material substrate.

In the first etched metallic material of the present invention, etching pits are formed based on the fine pattern on the first composite metallic material. Therefore, as mentioned above, etching pits uniformly distributed with high density are formed, and the surface area are enlarged sufficiently.

By using the etched metallic material for an etched aluminum material for electrolytic capacitor electrodes, the electric capacitance can be increased.

In the second etched metallic material according to the present invention, etching pits are formed based on the fine spots of the second composite metallic material. Therefore, as mentioned above, etching pits uniformly distributed with high density are formed, and the surface area are enlarged sufficiently.

By using the etched metallic material for an etched aluminum material for electrolytic capacitor electrodes, the electric capacitance can be increased.

According to one of the methods for manufacturing the aforementioned first etched metallic material, the first composite metallic material is subjected to etching processing without removing the high polymer thin film to thereby form etching pits. Therefore, an etched metallic material having etching pits uniformly distributed with high density can be obtained.

According to the other of the methods for manufacturing the aforementioned first etched metallic material, the first composite metallic material is subjected to initial etching processing without removing the high polymer thin film to thereby form etching pits, and then removing the high polymer thin film and then subjected to etching processing to thereby grow etching pits. Therefore, an etched metallic material having etching pits uniformly distributed with high density can be obtained.

In the methods for manufacturing these etched metallic materials, in cases where the etched metallic material is an etched aluminum material for electrolytic capacitor electrodes, an electrode material with increased electric capacitance due to the enlarged surface area can be obtained.

According to the method for manufacturing the second etched metallic material according to the present invention, etching pits are formed based on the fine spots by subjecting the second composite metallic material to etching processing. Therefore, an etched metallic material having etching pits uniformly distributed with high density can be obtained.

In the method of manufacturing the etched metallic material, in cases where the etched metallic material is an etched aluminum material for electrolytic capacitor electrodes, an electrode material with increased electric capacitance due to the enlarged surface area an be obtained.

Since the electrolytic capacitor according to the present invention is made of the aforementioned etched metallic material as an electrode material, high capacitance can be obtained, resulting in a small and high-performance electrolytic capacitor, which in turn enables a miniaturized and high-performance electronics device mounting the electrolytic capacitors.

DETAILED DESCRIPTION OF THE PREFERRED EMBODIMENTS

First Composite Metallic Material

Figure 1A:
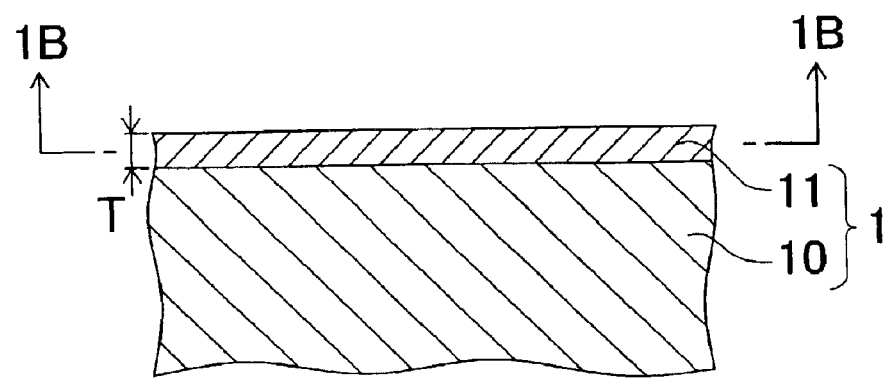
FIG. 1A is a schematic vertical cross-sectional view showing an embodiment of the first composite metallic material according to the present invention.
Figure 1B:
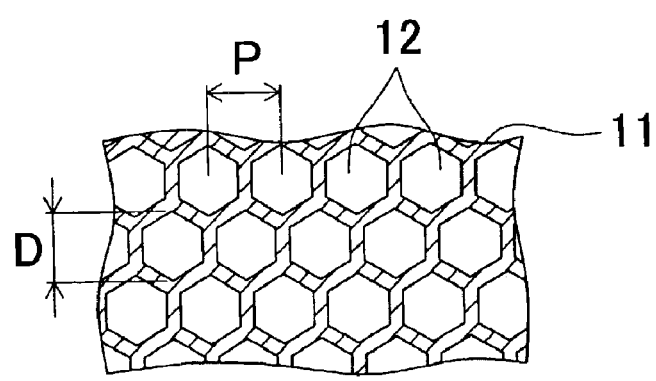
FIG. 1B is a cross-sectional view taken along the line 1B—1B in FIG. 1A.

FIGS. 1A and 1B show schematic cross-sectional views of an embodiment of the first composite metallic material according to the present invention. In this composite metallic material 1, the high polymer thin film 11 laminated on the surface of the metallic material substrate 10 is a film formed by self-organization of a high polymer compound, and has a fine pattern formed at the time of forming the film. Although the high polymer thin film 11 may be laminated on at least one surface of the metallic material substrate 10, in cases where the film is used for an aluminum material for electrolytic capacitor electrodes, it is preferable to laminate on both surfaces in order to enlarge the surface area as large as possible.

The high polymer thin film 11 is formed by drying a hydrophobic organic solvent solution of a high polymer compound (hereinafter referred to as "polymer solution"). For example, when the polymer solution is cast on the surface of the substrate and dried, the high polymer compound is self-organized on the substrate to form the film having a fine pattern.

As the fine pattern, the pore structure in which a number of pores 12 are arranged as shown in FIG. 1B can be exemplified. In one embodiment of the first composite metallic material 1 of this invention, the pores 12 function as introduction passages for leading the etching liquid to the surface of the metallic material substrate 10.

Figure 2A:
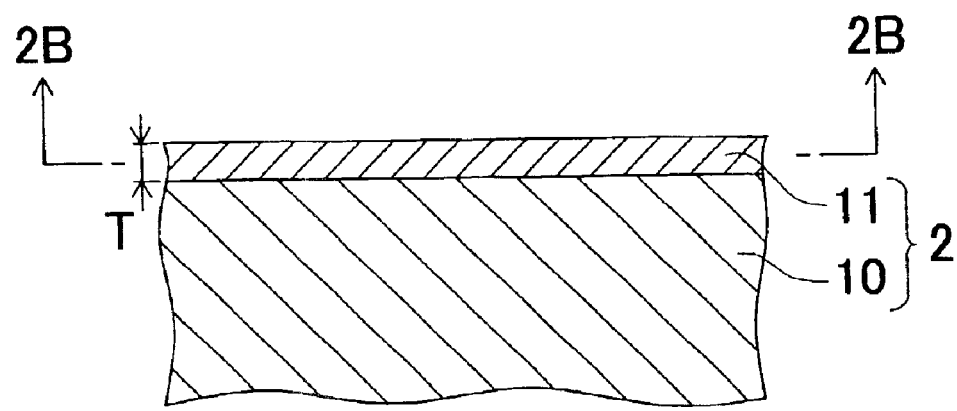
FIG. 2A is a schematic vertical cross-sectional view showing another embodiment of the first composite metallic material according to the present invention.
Figure 2B:
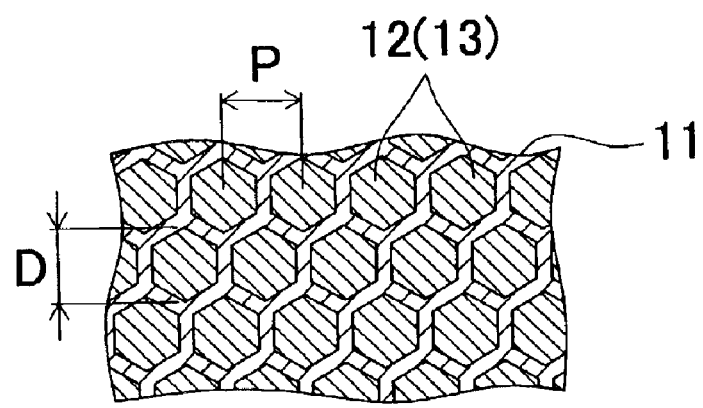
FIG. 2B is a cross-sectional view taken along the line 2B—2B in FIG. 2A.

Furthermore, FIGS. 2A and 2B show another embodiment of the first composite metallic material according to the present invention. In this composite metallic material 2, a substance having conducting property higher than that of oxides of the metallic material substrate 10 (hereinafter referred to as "high conductive material") is filled in the fine pores 12. The high conductive material functions as an etching core, as will be detailed later.

The high polymer thin film 11 having a fine pore structure as the fine pattern is formed via, for example, the following steps.

In the polymer solution cast on the substrate, the organic solvent draws latent heat during the evaporation to thereby condense the water molecules in the air on the surface of the polymer solution into fine particles. On the other hand, because of the function of the hydrophilic portion of the polymer solution, the surface tension between the water and the hydrophobic organic solvent decreases. Thereby, water fine particles agglutinate into a single mass as a fine water drop. Since the size of the water drop is approximately even, the water drops will be arranged in a closely arranged manner as the solvent evaporates, resulting in a regularly arranged state. As the water drops further evaporate, the portions where water drops existed become pores, whereby pores 12 extending in the thickness direction of the film are formed. The water drops function as casting molds, which forms a high polymer thin layer 11 with a honeycomb structure having a regular fine pore structure. FIGS. 1B and 2B exemplify a high polymer thin film 11 in which a number of hexagonal fine pores 12 are formed in a closely arranged manner. The pore is often formed into a shape closed to a hexagonal shape or a circular shape other than the illustrated hexagonal shape. Furthermore, the regular fine pore structure does not mean a strict geometric regular structure but means a structure with regularity other than a random structure. Accordingly, pores having slight irregularity in pore shape, pore diameter and pore intervals fall within the meaning of the regular fine pore structure because the below-mentioned etching pits uniformly formed with high density can be formed without causing problem even if they have slight irregularity.

In manufacturing the first composite metallic material 1 and 2 of the present invention, the aforementioned high polymer thin film 11 can be formed on the metallic material substrate 10 in a closely adhered manner by directly casting polymer solution on the surface of the metallic material substrate. That is, the forming of the high polymer thin film 11 and the lamination of the film on the metallic material substrate 10 can be performed simultaneously. Furthermore, a high polymer thin film 11 formed on another substrate may be removed and adhered on the metallic material substrate 10. In cases where the high polymer thin film is formed on another substrate, the substrate may be solid or liquid other than metal. The solid includes, for example, an inorganic material such as glass, silicon wafer and organic high polymer material excellent in organic solvent-proof such as polypropylene, polyethylen or ketone polyether. The liquid includes, for example, water, liquid paraffin and liquid polyether. Among another substrates, water is preferably used because water is excellent in removing the high polymer thin film and holding the fine pore structure.

The high polymer composite forming the high polymer thin film is not limited to a specific one. An amphiphilic high polymer compound with hydrophobic property and hydrophilic property can be exemplified as a preferable high polymer compound. It may be a homopolymer of one kind of amphiphilic molecule or a copolymer of two kinds of amphiphilic molecules. Furthermore, it may be a copolymer with molecules other than an amphiphilic molecule or may include a surfactant.

As the aforementioned amphiphilic high polymer compound, it is preferable to use an amphiphilic high polymer compound having an ion complex of polystyrene sulfonic acid and long chain dialkyl ammonium salt, polyethylene glycol/polypropylene glycol block copolymer and acrylamide polymer as a principal chain frame, a dodecyl group as hydrophobic side chain and lactose group or carboxyl group as hydrophilic side chain, or ion complex of anion nature high polymers, such as heparin or dextran sulfuric acid, nucleic acid (DNA and RNA) and long chain alkyl ammonium salt, water-soluble protein, such as gelatin, collagen or albumin as hydrophilic group.

Furthermore, polystyrene phosphinic acid, polystyrene sulfonic acid, polylactic acid, polycarbonate, etc. can be exemplified as another high polymer compounds.

As a hydrophobic organic solvent for melting a high polymer compound, halogen series solvent such as chloroform, ester series such as ethyl acetate, nonaqueous ketone, carbon disulfide, etc. can be exemplified, and these mixed solvents can also be used.

In the polymer solution, it is preferable that the density of the high polymer compound is 0.01 to 10 mass %. If the density is less than 0.01 mass %, the strength of the high polymer thin film 11 becomes insufficient. To the contrary, if it exceeds 10 mass %, it becomes difficult to form the fine pores 12 and keep the stable configuration thereof. The preferable density is 0.05 to 5 mass %.

The preferable film forming environment is a high humidity atmosphere to attain the evaporation of the organic solvent and the condensation of fine water drops and the evaporation. Concretely, the film forming is preferable performed in an atmosphere in which the relative humidity is 50 to 95% and the temperature is 10 to 25° C.

The preferable diameter D of the fine pore 12 is 0.01 to 50 μm. This dimension is preferably employed in a case where the composite metallic material 1 is used as an aluminum material for electrolytic capacitor electrodes to be subjected to etching processing to effectively increasing the expansion ratio by evenly forming a number of etching pits. The more preferable diameter D of the pore 12 is 0.1 to 5 μm.

It is preferable that the pitch P of the pores is 1 to 50 μm. If it is less than 1 μm, adjacent pits may be joined at the time of etching. To the contrary, if it exceeds 50 μm, it becomes difficult to increase the number of pits. It is more preferable that the pitch of the pores 12 is 1 to 15 μm.

Furthermore, the high polymer thin film 11 is preferably formed to have a thickness T of 100 nm to 2 μm. In cases where the composite metallic material is used as an aluminum material for electrolytic capacitor electrodes, it is preferable to form the thin film to have a thickness of 0.5 to 1 μm.

Regarding the metallic material substrate 10 constituting the composite metallic material 1 and 2, the kind of metal, the thickness, etc. are not specifically limited, and may be appropriately selected depending on the usage.

As for the kind of metal, a valve-action metal used as an electrode material for electrolytic capacitor can be exemplified. As the valve-action metal, a metal simple substance such as aluminum, tantalum, magnesium, titanium, niobium, zirconium, zinc, bismuth or silicon, hafnium, or an alloy in which boron and tin, chromium and vanadium, or palladium and antimony are added to titanium can be exemplified. Among these metals, an aluminum can be recommended. Furthermore, in these metallic material substrate, impurities may be included, or trace elements may be added if needed. For example, in case of aluminum, as the trace elements, Si, Fe, Cu, Pb, Zn, Ga, Zr or the like can be exemplified. However, in the case of an aluminum material for electrolytic capacitor electrodes, for the purpose of restrain the generation of film defects during the conversion treatment, it is preferable to use a high purity aluminum of the purity of 99.9% or more.

In the case of an etched metallic material, although the thickness is not limited, for the purpose of obtaining the strength and/or the flexibility after etching processing, it is preferable that the thickness is 0.05 to 0.3 mm, more preferably 0.07 to 0.2 mm, the most preferably 0.07 to 0.15 mm.

Furthermore, in the metallic material substrate 10, the heat treatment and the crystal structure are not limited. For example, in an aluminum material, a hard material to which no heat treatment is executed is formed into an aggregation of elongated fiber-like crystals elongated in the rolling direction. If such a hard material is annealed at 300 to 400° C., it becomes a soft material in which the primary recrystallization has been nearly completed, and if such a hard material is annealed at 450 to 600° C., it becomes a soft material in which crystal grains having stable high (100) sides have grown. In the present invention, either metallic material substrate mentioned above can be used. Furthermore, the metallic material substrate 10 can be a coiled elongated member or a cut member.

Furthermore, since the high conductive material 13 filled in the fine pores 12 is dissolved preferentially at the time of etching to become a pit-generation core, the high conductive material 13 should be selected in relation to the conductivity of the metallic material substrate 10. In the case in which the metallic material substrate 10 is aluminum, Pb, PbO, Cu, CuO, $Cu_2O$ and C whose conductivity is higher than that of aluminum can be exemplified. Among these, Pb and PbO can be recommended.

As for the method for filling the high conductive material 13 into the fine pores 12, plating, spattering, depositing, immersing, CVD, spray coating, ion plating, etc. can be exemplified. Among these, plating, depositing and immersing can be recommended because the filling speed is fast and the filling can be performed with less damage at low cost.

The aforementioned first composite metallic material 1 and 2 is subjected to etching processing to thereby form the first etched metallic material.

In the etching processing, as for the composite metallic material 1 with the high polymer thin film 11 as shown in FIGS. 1A and 1B, the etching liquid arrives at the metallic material via the pores 12 forming a fine pattern to thereby form etching pits. Since the etching pits 12 are arranged finely, the tunnel-like etching pits will grow in the thickness direction in accordance with the fine pattern. Thus, the fine and high density etching pits will be formed evenly, thereby enlarging the surface area. Furthermore, since the distance between the adjacent pores are kept larger than the chemical film which will be formed later, joining of pores will hardly occur. By using an etched metallic material having such etching pits such as an etched aluminum material, high capacitance can be obtained due to the enlarged surface area.

Furthermore, in the composite metallic material 2 in which high conductive material 13 is filled in the pores 12 as shown in FIGS. 2A and 2B, the high conductive material 13 dissolves first and therefore the pores 12 will be exposed. Subsequently, etching pits will be formed at the portions of the metallic substrate corresponding to the pores 12. Since the high conductive materials 13 exit at the pore existing portions, in the same manner as in the composite metallic material 1, tunnel-like etching pits will be formed in accordance with the fine pattern, thereby enlarging the surface area, which in turn results in high capacitance.

Etching processing conditions are not limited, and may be conventional conditions in accordance with the intended purpose. For example, in cases of an aluminum material for electrolytic condenser electrodes, in general, electrolytic etching is performed in the solution in which phosphoric acid, sulfuric acid, nitric acid, etc. are added in aqueous solution including chlorine ion. Furthermore, in cases of material for low voltage, alternating current etching is generally employed. In cases of material for middle or high voltage, direct current etching is generally employed. As for etching conditions, alternating current etching or direct current etching of frequency of 1 to 1,000 Hz, current density of 0.025 to 20 A/cm$^2$, electric charge of 0.02 to 100 C/cm$^2$ can be exemplified. Direct current etching and alternating current etching can be combined. Alternatively, only direct current etching can be performed. Furthermore, multistage etching can be employed, or chemical etching can be employed.

The aluminum material for electrolytic capacitor electrodes manufactured by the present invention can be preferably used as material for middle or high voltage, but not limited it.

The high polymer thin film can be removed after forming the etching pits, or can be kept without removing. Furthermore, at the early etching pit forming stage, the high polymer thin film can be removed and thereafter etching processing for increasing the surface expansion ratio can be performed. In any case, the high polymer thin film can be easily removed with organic solvent such as acetone, methyl ethyl ketone, toluene, methyl cellosolve, ethyl acetate, petroleum ether, etc. Alternatively, the high polymer thin film can be easily removed by immersing into warm water whose temperature is more than the melting temperature of the high-polymer thin film.

The etched metallic material according to the present invention include both an etched metallic material from which the high polymer thin film is removed and an etched metallic material in which the high polymer thin film remains.

The appropriate pit of the etching pits of the etched metallic material differs depending on the working voltage of the electrolytic condenser. In cases of the material to be used at middle voltage (250 to 350 volt), it is preferable that the pit diameter is 0.7 to 2 $\mu$m and the pit distance is 1 to 2.5 $\mu$m. In cases of the material to be used at high voltage (500 volt), it is preferable that the pit diameter is 1.5 to 3 $\mu$m and the pit distance is 2 to 4 $\mu$m. The pit diameter mentioned above means the mean value, and it is not always required that all of the pits fall within the above range.

Although the etched aluminum material for electrolytic condenser electrodes are subjected to chemical conversion, the conditions are not limited. The conditions can be exemplified as follows: electrolytic solution includes at least one of oxalic acid, adipic acid, boric acid, phosphoric acid, sodium silicate; the electrolytic solution density is 0.05 to 20 mass %; the electrolytic solution temperature is 0 to 90° C.; the current density is 0.1 mA/cm$^2$ to 1 A/cm$^2$; and the processing is performed for 60 minutes or less at a predetermined voltage. More preferably, the electrolytic solution density is 0.1 to 15 mass %, the electrolytic solution liquid temperature is 20 to 70° C., the current density is 1 to 100 mA/cm$^2$, the processing time is 30 minutes or less. After the chemical conversion processing, if necessary, phosphoric acid immersing processing for waterproof improvement, heat treatment or immersing processing to boiling water for coat strengthening can be performed.

Furthermore, in the electrolytic capacitor, by using the aforementioned etched metallic material, i.e., the metallic material with an enlarged surface area, as an electrode material, high capacitance can be obtained.

Second Composite Metallic Material

Figure 3A:
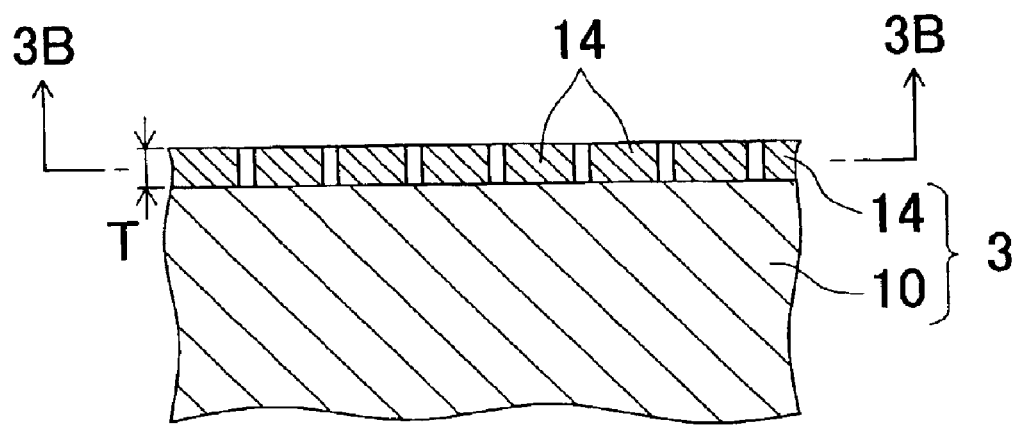
FIG. 3A is a schematic vertical cross-sectional view showing an embodiment of the second composite metallic material according to the present invention.
Figure 3B:
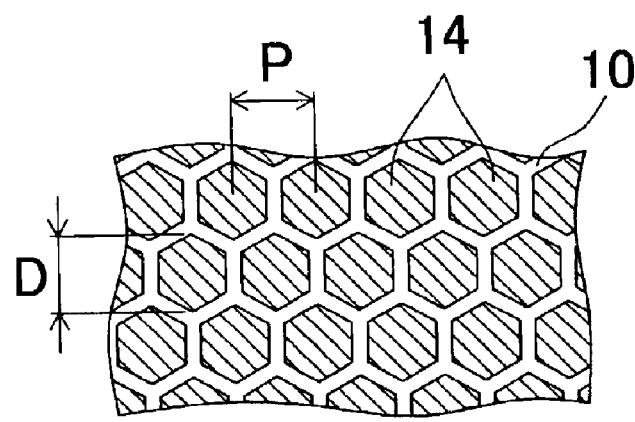
FIG. 3B is a cross-sectional view taken along the line 3B—3B in FIG. 3A.

FIGS. 3A and 3B are schematic views showing an embodiment of the second composite metallic material according to the present invention. In this composite metallic material 3, arranged on at least one surface of the metallic material substrate 10 are a number of fine spots 14 made of a substance with conductivity higher than that of the oxide of this metallic material substrate 10, i.e., the substance equal to the high conductive substance filled in the fine pores 12 of the aforementioned first composite metallic material 2.

The aforementioned fine spots 14 can be formed by disposing a high polymer thin film having a number of pores on the surface of the metallic material substrate 10, filling high conductive substance whose conductivity is higher than that of the oxide of the metallic material substrate in the pores, and thereafter removing the high polymer thin film. In other words, in the first manufacturing method of the aforementioned composite metallic material 2, the fine spots 14 can be formed by removing the high polymer thin film 11 after filling the high conductive substance 13 in the fine pores 12 of the high polymer thin film 11. Accordingly, in the second composite metallic material, the material and thickness of the metallic material substrate 10 and the material of the high conductive substance can be the same as in the first composite metallic material. Furthermore, the diameter D and the pitch P of the fine spots 14 of the high conductive substance can be the same as those of the pores 12 of the first composite metallic material 1 and 2.

Furthermore, regarding the manufacturing method of the second composite metallic material 3, the step for filling the high conductive substance in the pores of the high polymer thin film 11 disposed on the surface of the metallic material substrate 10 and the steps preceding the filling step are the same as the manufacturing steps of the first composite metallic material 2. Accordingly, the method for forming the high polymer thin film 11 and the method for filling the high conductive material can be the same as those of the method for manufacturing the first composite metallic material 2.

As the method for removing the high polymer thin film 11, a dissolution removing method in which the thin film is removed by using organic solvent such as acetone, methyl ethyl ketone, toluene, methyl cellosolve, ethyl acetate, and petroleum ether and a dissolution removing method in which the thin film is removed by immersing it into warm water of a temperature higher than the melting temperature of the high polymer thin film can be exemplified.

The aforementioned second composite metallic material 3 is subjected to etching processing, and thus the etched second metallic material according to the present invention is manufactured.

In the etching processing, since the high conductive material is arranged in the fine spots 14, the tunnel-like etching pits will grow in the thickness direction in accordance with the fine spots. Thus, the fine and high density etching pits will be formed evenly, thereby enlarging the surface area. Furthermore, since the distance between the adjacent pores are kept larger than the chemical film which will be formed later, joining of pores will hardly occur. By using an etched metallic material having such etching pits such as an etched aluminum material, high capacitance can be obtained due to the enlarged surface area.

The etching conditions can be the same as those of the manufacturing method of the aforementioned first etched metallic material. The appropriate pits or the chemical conversion conditions in cases of being used as an aluminum material for electrolytic capacitor electrodes can be the same as those of the etched first metallic material.

EXAMPLE

In manufacturing the metallic material substrate, first, high purity aluminum ingots of 99.99% of Al purity were formed in accordance with semi-continuous casting. Then, these ingots were subjected to homogenization processing, surface cutting, hot rolling, cold rolling, process annealing, etc. by conventional methods and rolled into foils. Thus, aluminum material substrates 10 of 110 µm thickness were manufactured. These aluminum material substrates 10 were subjected to degreasing washing, and then disposed in an annealing furnace of Ar gas atmosphere. In the furnace, the actual temperature was raised from room temperature to 540° C. at the rate of 50° C./h and then the substrates were kept for 24 hours at 540° C. Thereafter, the substrates were cooled naturally in the furnace. These substrates were used as common aluminum material substrates in the following examples.

Plural kinds of composite aluminum materials I-A, I-B, I-C, I-D were formed by forming different high polymer thin films 11 of pore structure from the aluminum material substrates 10 by changing processing conditions. These composite aluminum materials I-A, I-B, I-C, I-D correspond to the first composite metallic materials 1 shown in FIGS. 1A and 1B according to the present invention.

Composite Aluminum Material I-A

In forming a high polymer thin film 11, as polymer solution, 3 g/l chloroform solution of poly ion complex formed from polystyrene sulfonic acid and chlorination dimethyl octa decyl ammonium was prepared. Then, the polymer solution was cast to the one surface side of the aluminum material substrate 10 at the rate of 5 ml/m², and high humidity air of 20° C. and 70% relative humidity were sprayed for 1 minute at the flow rate of 3 l/minute. As a result, as shown in the composite metallic material 1 shown in FIG. 1, the high polymer thin film 11 with regularly arranged hexagonal tunnel-like fine pores 12 was formed on the surface of the aluminum material substrate 10. The high polymer thin film 11 had the thickness T of 2 µm, and the mean diameter D of the fine pores 12 was 3 µm and the mean pore pitch P was 5 µm. Furthermore, on the other surface side of the aluminum material substrate 10, the same processing was executed to thereby form a high polymer thin film 11 with regular pore structure.

Composite Aluminum Material I-B

A composite aluminum material was obtained in the same manner as in I-A except that the poly ion complex concentration was 1 g/l chloroform solution and the spraying amount of high humidity air was 2 l/minute. The high polymer thin film 11 had the thickness T of 2 µm, and the mean diameter D of the fine pores 12 was 2 µm and the mean pore pitch P was 3 µm.

Composite Aluminum Material I-C

A composite aluminum material was obtained in the same manner as in I-A except that polycaprolactone was used instead of the polystyrene sulfonic acid of the polymer solution. The high polymer thin film 11 had the thickness T of 10 µm, and the mean diameter D of the fine pores 12 was 5 µm and the mean pore pitch P was 7 µm.

Composite Aluminum Material I-D

A composite aluminum material was obtained in the same manner as in I-C except that the casting amount of the polymer solution was 0.5 ml/m². The high polymer thin film 11 had the thickness T of 1 µm, and the mean diameter D of the fine pores 12 was 5 µm and the mean pore pitch P was 7 µm.

Furthermore, high conductive substance were filled in the fine pores 12 of the high polymer thin film 11 of these composite aluminum material I-A, I-B, I-C and I-D. Thus, composite aluminum material II-A, II-B, II-C and II-D having the structure of the composite metallic material 2 shown in FIGS. 2A and 2B were formed. These composite aluminum material II-A, II-B, II-C and II-D correspond to the first composite metallic material of the present invention.

Composite Aluminum Material II-A

Pb was filled in the fine pores of the high polymer thin film of the composite aluminum material I-A by electroplating. The plating were performed by passing current for 30 seconds at the current density of 1 A/m² by using a Pb plate as anode.

Composite Aluminum Material II-B

Cu was filled in the fine pores of the high polymer thin film of the composite aluminum material I-B by electroplating. The plating were performed by passing current for 30 seconds at the current density of 1 A/m² by using a Cu plate as anode.

Composite Aluminum Material II-C

C was deposited on the composite aluminum material I-C by normal method to fill C in the fine pores of the high polymer thin film.

Composite Aluminum Material II-D

The composite aluminum material I-D was immersed in the solution of Pb ion concentration of 0.5 mol/l for two minutes and then dried in a dryer at 80° C. to thereby fill Pb compound (oxide) in the pores of the high polymer thin film.

Furthermore, the high polymer thin film 11 was removed from each of these composite aluminum material II-A, II-B and II-C to thereby form composite aluminum material substrates III-A, III-B and III-C in which fine spots 14 of high conductive substrate were arranged on the surface of the metallic material substrate 10. These composite aluminum material III-A, III-B and III-C correspond to the third composite metallic material 3 of the present invention shown in FIGS. 3A and 3B.

Composite Aluminum Material III-A

The high polymer thin film was removed by immersing the composite aluminum material III-A in acetone for one minute to thereby obtain a composite aluminum material III-A with arranged fine spots of Pb.

Composite Aluminum Material III-B

The high polymer thin film was removed by immersing the composite aluminum material II-B in methyl ketone for one minute to thereby obtain a composite aluminum material III-B with arranged fine spots of Cu.

Composite Aluminum Material III-C

The high polymer thin film was removed by immersing the composite aluminum material II-C in warm water of 90°

C. for three minutes to thereby obtain a composite aluminum material III-C with arranged fine spots of C.

Next, in each Example, each of the aforementioned composite aluminum materials were subjected to etching processing under any one of the following conditions A and B On the other hand, etched aluminum materials for electrolytic capacitor electrodes were subjected to chemical conversion in Boric acid bath at 350 V, and each capacitance was measured. The capacitance is shown in Table 1 as a relative value provided that the capacitor of Comparative Example No. 20 is 100%.

TABLE 1

|  | No. | Form | Composite aluminum material | | | | Etching | | | Capacitance % |
|---|---|---|---|---|---|---|---|---|---|---|
|  |  |  | Film thickness T(μm) | Fine pores | | High conductive substance | Conditions | Pit diameter μm | Pit interval μm | |
|  |  |  |  | Diameter D (μm) | Pitch P(μm) |  |  |  |  |  |
| Example | 1 | I-A | 2 | 3 | 5 | — | A | 1.0–6.0 | 2.0–6.0 | 130 |
|  | 2 | I-A | 2 | 3 | 5 | — | B | 0.8–7.0 | 1.0–4.0 | 125 |
|  | 3 | I-A | 2 | 2 | 3 | — | A | 1.0–4.0 | 1.0–4.0 | 140 |
|  | 4 | I-C | 10 | 5 | 7 | — | A | 1.0–8.0 | 4.0–10.0 | 120 |
|  | 5 | I-D | 1 | 5 | 7 | — | A | 1.0–8.0 | 4.0–10.0 | 120 |
|  | 6 | II-A | 2 | 3 | 5 | Pb | A | 1.0–5.0 | 3.0–5.0 | 145 |
|  | 7 | II-A | 2 | 3 | 5 | Pb | B | 0.8–6.0 | 2.0–4.0 | 140 |
|  | 8 | II-B | 2 | 2 | 3 | Cu | A | 1.0–3.5 | 1.0–4.0 | 135 |
|  | 9 | II-B | 2 | 2 | 3 | Cu | B | 0.8–4.5 | 1.0–8.0 | 135 |
|  | 10 | II-C | 10 | 5 | 7 | C | A | 1.0–7.0 | 4.0–10.0 | 125 |
|  | 11 | II-C | 10 | 5 | 7 | C | B | 0.8–7.5 | 4.0–9.0 | 125 |
|  | 12 | II-D | 1 | 5 | 7 | Pb compound | A | 1.0–7.0 | 4.0–10.0 | 125 |
|  | 13 | II-D | 1 | 5 | 7 | Pb compound | B | 1.0–7.5 | 4.0–9.0 | 125 |
|  | 14 | III-A | 2(removed) | 3 | 5 | Pb | A | 1.0–5.5 | 2.5–5.5 | 130 |
|  | 15 | III-A | 2(removed) | 3 | 5 | Pb | B | 0.8–6.5 | 1.5–4.5 | 125 |
|  | 16 | III-B | 2(removed) | 2 | 3 | Cu | A | 1.0–4.0 | 1.5–4.5 | 135 |
|  | 17 | III-B | 2(removed) | 2 | 3 | Cu | B | 0.8–4.5 | 1.0–3.5 | 125 |
|  | 18 | III-C | 10(removed) | 5 | 7 | C | A | 1.0–6.5 | 3.5–10.5 | 130 |
|  | 19 | III-C | 10(removed) | 5 | 7 | C | B | 0.8–7.0 | 9.0–9.5 | 125 |
| Comparative Example | 20 |  | Only aluminum substrate | | | | A | 0.7–4.0 | Uneven | 100 | to thereby form No.1 to 19 etched aluminum material for electrolytic capacitor electrodes shown in Table 1. Further, in Comparative Example No. 20, an aluminum material substrate 10 with no high polymer thin film 11 was subjected to etching processing.

Etching Condition A

A composite aluminum material was immersed in the first electrolyte of 80° C. (1 mol/l hydrochloric acid+3.2 mol/l sulfuric acid aqueous solution) and DC of current density 0.2 A/cm² was applied for 100 seconds for electrolytic etching. Furthermore, the composite material was immersed in the second electrolyte of 90° C. (1.5 mol/l hydrochloric acid+ 0.0056 mol/l oxalic acid aqueous solution) for 10 minutes for chemical etching.

Etching Condition B

A composite aluminum material was immersed in 10% ferric chloride aqueous solution of 50° C. for 10 minutes. Then it was raised therefrom and washed with water. Thus, only the fine spot portions of the high polymer thin film or the fine spot portions of the high conductive substance was chemically etched. Further, it was immersed in the second electrolyte (5% hydrochloric acid+10% sulfuric acid aqueous solution) of 75° C., and DC of current density 0.2 A/cm² was applied for 100 seconds for electrolytic etching. Subsequently, in the solution, chemical etching was executed for ten minutes.

Regarding the aluminum material for electrolytic capacitor electrodes etched in the aforementioned Examples and Comparative Example, the pit diameter of etching pit and pit interval were measured. The measured results are shown in Table 1. It shows that these measured values of more than one half of the pits fall within the range.

From the results shown in Table 1, it is confirmed that the etched aluminum materials for electrolytic capacitor electrodes manufactured in each Example are more uniform in etching pit diameter and interval as compared to Comparative Example and can obtain high capacitance due to the increased surface expansion ratio. On the other hand, in Comparative Example, some etching pits are joined, some etching pits are formed larger and the pit intervals are uneven.

The terms and descriptions in this specification are used only for explanatory purposes and the present invention is not limited to these, but many modifications and substitutions may be made without departing from the spirit of the scope of the present invention which is defined by the appended claims.

INDUSTRIAL APPLICABILITY

A composite metallic material according to the present invention is capable of generating high density etching pits evenly based on the fine pattern regularly arranged in the high polymer thin film. Deep tunnel-like etching can be performed from the pits as starting points without causing a joining of the tunnel-like etching, increasing the surface expansion ratio assuredly, which in turn can increase the capacitance of an electrolytic capacitor. As a result, an electrolytic capacitor can be decreased in size and enhanced in performance, and therefore electronics devices using the electrolytic capacitors can be decreased in size and enhanced in performance.

What is claimed is:

1. A composite metallic material comprising:

a metallic material substrate; and a high polymer thin layer having a fine pattern formed on at least one surface of the substrate by self-organization, wherein the fine pattern comprises a plurality of pores and each of the pores has a diameter of 2 $\mu$m to 5 $\mu$m.

2. The composite metallic material as recited in claim 1, wherein the pores are formed at intervals of 1 to 50 $\mu$m.

3. The composite metallic material as recited in claim 2, wherein a substance having conducting property higher than that of oxides of the metallic material substrate is filled in the pores.

4. The composite metallic material as recited in claim 1, wherein a substance having conducting property higher than that of oxides of the metallic material substrate is filled in the pores.

5. The composite metallic material as recited in claim 4 or 3, wherein the metallic material substrate is made of valve-action metal.

6. The composite metallic material as recited in claim 5, wherein the valve-action metal is aluminum.

7. The composite metallic material as recited in claim 6, wherein the composite metallic material is an aluminum material for electrolytic capacitor electrodes.

8. A composite metallic material, comprising:
a metallic material substrate; and
a plurality of fine spots comprising a material having conducting property higher than that of oxides of the metallic material substrate, the fine spots being arranged on at least one surface of the metallic material substrate;
wherein each of the fine spots has a diameter of 2 $\mu$m to 5 $\mu$m.

9. The composite metallic material as recited in claim 8, wherein the fine spots are formed at intervals of 1 to 50 $\mu$m.

10. The composite metallic material as recited in claim 8, wherein the metallic material substrate is made of valve-action metal.

11. The composite metallic material as recited in claim 10, wherein the valve-action metal is aluminum.

12. The composite metallic material as recited in claim 11, wherein the composite metallic material is an aluminum material for electrolytic capacitor electrodes.

* * * * *